(12) United States Patent
Heyl et al.

(10) Patent No.: US 12,287,722 B2
(45) Date of Patent: Apr. 29, 2025

(54) METHOD FOR THE PROVISION OF A FUNCTION BY A GROUP OF COMPUTING UNITS

(71) Applicant: Robert Bosch GmbH, Stuttgart (DE)

(72) Inventors: Andreas Heyl, Weil der Stadt (DE); Christian Zimmermann, Stuttgart (DE); Markus Schweizer, Vaihingen/Enz (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 120 days.

(21) Appl. No.: 18/046,747

(22) Filed: Oct. 14, 2022

(65) Prior Publication Data

US 2023/0129174 A1    Apr. 27, 2023

(30) Foreign Application Priority Data

Oct. 21, 2021    (DE) ...................... 10 2021 211 907.7

(51) Int. Cl.
*G06F 1/24*    (2006.01)
*G06F 9/00*    (2018.01)
*G06F 11/34*    (2006.01)

(52) U.S. Cl.
CPC ................................ *G06F 11/3495* (2013.01)

(58) Field of Classification Search
CPC .................................................. G06F 11/3495
See application file for complete search history.

(56) References Cited

U.S. PATENT DOCUMENTS

| | | | |
|---|---|---|---|
| 10,389,709 B2* | 8/2019 | Potlapally | H04L 63/12 |
| 10,798,387 B2* | 10/2020 | Li | H04N 17/004 |
| 11,086,648 B1* | 8/2021 | de Kadt | G06F 9/45537 |
| 2007/0071072 A1* | 3/2007 | Banister | H04B 1/7117 |
| | | | 375/E1.032 |
| 2018/0167620 A1* | 6/2018 | Li | H04N 21/23439 |
| 2022/0012112 A1* | 1/2022 | Wouhaybi | G06F 11/3447 |
| 2022/0129551 A1* | 4/2022 | Collier | G06F 21/565 |
| 2022/0360594 A1* | 11/2022 | Cosgrove | H04L 9/3247 |

* cited by examiner

*Primary Examiner* — Mohammed H Rehman
(74) *Attorney, Agent, or Firm* — NORTON ROSE FULBRIGHT US LLP

(57) ABSTRACT

A method for providing a function by a group of computing units in which computation instances are executed, each computation instance implementing the function using at least one algorithm and being set up to determine at least one result in response to a call of the function. The method includes: determining an integrity level for each of the computation instances; receiving a function request from a subscriber, the function request including a quality requirement that includes an integrity requirement; selecting a plurality of the computation instances corresponding to the quality requirement, so that the integrity level of the selected computation instances corresponds to the integrity requirement; calling the function in the selected computation instances corresponding to the function request in order to determine a plurality of results; determining a response based on the results, taking into account the quality requirement; and sending the response to the subscriber.

17 Claims, 2 Drawing Sheets

METHOD FOR THE PROVISION OF A FUNCTION BY A GROUP OF COMPUTING UNITS

CROSS REFERENCE

The present application claims the benefit under 35 U.S.C. § 119 of German Patent Application No. DE 10 2021 211 907.7 filed on Oct. 21, 2021, which is expressly incorporated herein by reference in its entirety.

FIELD

The present invention relates to a method, a computing unit, and a computer program for the provision of a function by a group of computing units, and to a monitoring computing unit and a monitoring computer program.

BACKGROUND INFORMATION

Computing resources can be provided in decentralized fashion by computer systems. Examples of this are so-called "cloud computing" (computing resources available via a communication network, e.g., the Internet), or so-called "edge computing" (computing resources provided at the edge of a communication network). Modern networks, e.g., so-called 5G radiotelephone networks, can have high bandwidths together with low latency times. In this way, it is possible to relocate complex and computing-intensive algorithms that relate to the functionality or operation of machines, including vehicles, into computing resources that are provided in decentralized fashion, in order to reduce the load on control devices of the machines or to implement functions or functionalities that cannot be performed by control devices of the machines.

SUMMARY

According to the present invention, methods for the provision of a function by a group of computing units, and a providing computing unit and a providing computer program for carrying out the method, and in addition a monitoring computing unit and a monitoring computer program, are provided. Advantageous embodiments of the present invention are disclosed herein.

An example embodiment of the present invention uses the measure of determining integrity levels for computation instances, and, in response to a function call from a subscriber, calling the function in computation units that have an integrity level that corresponds to an integrity requirement included in the function call, in order to determine a plurality of results. From the results, a response is determined that is sent, or returned, to the subscriber. In this way, a precise monitoring of the integrity, i.e., of the trustworthiness of the correctness of the response, can be achieved. Potentially incorrect responses that do not meet the integrity requirement, as well as possibly other requirements included in the quality requirement, can be recognized and, if indications of the requirements that are not met are also sent, the subscriber can decide whether the response should be used.

In order to achieve this, according to an example embodiment of the present invention, a plurality of the computation instances are selected in accordance with the quality requirement, so that at least the integrity level (and possibly further requirements) of the selected computation instances meets the integrity requirement, and in these selected computation instances the function is called in accordance with the function request in order to determine a plurality of results. In particular, here call parameters of the function included in the function request can also be communicated. In addition, the determination of the response sent to the subscriber is made based on the results, taking into account the quality requirement. The taking into account of the quality requirement in the determination of the response may for example be that only results are taken into account that meet a response time requirement, or that indications are determined and are sent as a part of, or in addition to, the response to the subscriber that indicate to what extent the quality requirement is met.

The computation instances are preferably computer programs, but in principle can also be implemented completely or partially in hardware, e.g., as an ASIC (application-specific integrated circuit) or as an FPGA (field-programmable gate array), or the like. Combinations of computer programs with hardware are also possible. Each computation instance implements the function using at least one algorithm, and is set up to determine, when it is executed, at least one result in response to a call of the function. The computation instances can be provided for example in the form of so-called containers. The computation instances are executed in computing units of the group of computing units. Each computing unit (e.g. a computer or computer system) includes one or more processors each having at least one processor core in which the computation instances (in particular computer programs) are executed. In addition, each computing unit includes a volatile and/or a nonvolatile memory in which computation instances, implemented in particular as computer programs, can be stored. Each computing unit can be set up to execute a plurality of computation instances simultaneously, or in parallel. Each computing unit can be regarded as a particular hardware unit (e.g., particular processors, particular memories, etc.) (which can be different for different computing units) that represent a uniform environment for the execution of computation instances.

The "integrity level" or "trust level" is a measure of how trustworthy a computation instance is, or how trustworthy results determined by the computation instance are, e.g. in the sense of a probability that results are correct. The integrity level can be indicated as an integrity value, i.e., as at least one continuous or discrete numerical value within a determined value range. In the determination of the integrity level of a computation instance, various aspects that relate in particular to the computation instance itself and/or to the computing unit in which the computation instance is executed can be taken into account.

According to an example embodiment of the present invention, the quality requirement includes requirements or conditions that have to be met. These may be in particular requirements of the computation instances (e.g., the integrity requirement) and/or of the computing units in which the computation instances are executed, and/or of the results and/or the like. If the quality requirement cannot be met, or cannot be completely met, i.e. if not all requirements included in the quality requirement can be met, then preferably a corresponding error message is sent to the subscriber, or the response can include a corresponding error message.

The present invention can be carried out or initiated in computer-implemented fashion by a providing element, in particular a providing computing unit or a providing computer program executed in a computing unit. Likewise, individual steps (starting, monitoring and/or stopping of computation instances) can be carried out or initiated in computer-implemented fashion by a monitoring element, in particular a monitoring computing unit or a monitoring computer program executed in a computing unit.

The subscriber is in particular itself a computing unit, or includes such a computing unit; in both cases, in order to distinguish computing units of the group of computers, these are also designated subscriber-specific computing units, e.g. a control device of a vehicle or some other machine, a computer, in particular a mobile computer, or a computing unit included in a mobile device (such as a smartphone). The subscriber, i.e. the subscriber-specific computing unit or software executed therein, can request the function provided in the group of computing units. In general, a plurality of subscribers can request the function independently of one another. The function request, or request of the function, is a request to provide a response to a corresponding function call; here, in addition to the quality requirements, in particular the function request can include call parameters.

According to an example embodiment of the present invention, preferably, the quality requirement (in addition to the integrity requirement) includes one or more requirements that are selected from: a minimum number of different selected computation instances, a minimum number of different computing units in which the selected computation instances are executed, a minimum number of results, a minimum number of results that agree with the determined response within tolerances, and a maximum scatter of the results. In addition, it is possible to assign different priorities to different requirements. For example, it could be required that some requirements are to be met in every case (highest priority), while there can be deviations from some other requirements (lower priority). The priority could for example determine the degree up to which deviation from a requirement is permitted. For example, it could be provided that a response time requirement is to be met in every case, while deviations may occur from a minimum number of results to be taken into account. The requirement of the minimum number of different computing units can include requirements of different operating systems on the underlying computing units, of different memory configurations for storing data, and/or of different hardware (processors, memory components, etc.).

According to an example embodiment of the present invention, preferably, the selection of the computation instances is made corresponding to the quality requirement, on the basis of quality classifications of the computing units and/or of the computation instances that characterize which quality requirements are met by the computing units, the computation instances, and/or combinations of particular computing units and computation instances. Quality classifications can include for example a sorting into groups indicating how probable it is that the result of a computation instance is correct. Likewise, quality classifications can include a sorting into particular groups corresponding to time intervals for the call time durations of the computation instances. Quality classifications of computing units can for example relate to the hardware of the computing units (processor, memory, or the like), or to how strongly the computing units are secured against unauthorized access. The use of quality classifications enables a rapid selection of the computation instances.

According to an example embodiment of the present invention, preferably, a determination and/or modification of the quality classifications is done based on actual quality data obtained during the calling of the function and/or during the determination of the response. Actual quality data can be derived based on the results determined by the computation instances. For example, over a multiplicity of calls of the function it can be recorded how often a computation instance supplies results that do not agree with the finally determined responses, and from this a probability can be derived that the computation instance determines or provides a correct result. If a quality classification relates to call time durations of the computation instances, then for example for each computation instance, for a plurality of or for all calls, time durations can be measured that run from the respective call of the function up to the end of the determination (and reporting back) of the result (or results), and can be used as actual quality data.

According to an example embodiment of the present invention, preferably, the quality requirement includes a response time requirement. The response time requirement, or latency requirement, can take place for example in the form of a time span (e.g. indicated in seconds or fractions of seconds) or in the form of an absolute time indication, i.e. as a clock time. The latter in particular presupposes a synchronization of subscriber clock time and computer group clock time, which is already provided anyway in data communication networks or by GPS data. This enables the use of the method for time-critical functions.

According to an example embodiment of the present invention, preferably, the determination of the response is made based on the results provided within the response time requirement; here, further preferably the determination of the response is made based on the results that are given within the response time requirement taking into account a time offset. The time offset designates a time that is assumed and/or determined based on empirical values that is required to evaluate the fed back values, i.e. to determine the response, and/or to send or transmit the response to the subscriber, i.e. to return the response.

According to an example embodiment of the present invention, preferably, the response includes indications of the extent to which the quality requirement is met; further preferably, the indications include an integrity level actually achieved by the response. Here, it may occur that not all requirements included in the quality requirement are met, or it may occur that all the requirements included in the quality requirement are met; in the latter case, it may also occur that some requirements are more than met (e.g. if more results enter into the determination of the response than are required). In every case, the indications make it possible for the subscriber to decide to what extent the subscriber trusts the response, and whether the subscriber will use the response. The actually achieved integrity level can be indicated by the same measure (e.g. as an integrity value) as the integrity requirement. An error message can also be regarded as an indication of the extent to which the quality requirement is met.

According to an example embodiment of the present invention, preferably, the method includes a selection of at least one computing unit of the group of computing units, and starting the execution of at least one computation instance in the selected at least one computing unit. This enables, inter alia, an increase in the computing power available for function requests, in particular when a plurality of subscribers request the function, or when quality requirements otherwise cannot be met, e.g. a minimum number of different computing units and/or a minimum number of different computation instances.

According to an example embodiment of the present invention, preferably, the method includes a monitoring of at least one of the computation instances in order to determine, for the at least one monitored computation instance, a correctness measure that indicates whether or to what extent this instance is functioning correctly. For this purpose, for example test calls of the function or of a test function (also implemented in the computation instance) are carried out, and test results of these test calls are compared with corresponding known reference results. Checksums or hash values for memory areas in which the computation instances are stored in the computing units may also be calculated and compared with corresponding reference sums or reference values. Quality classifications of the computation instances may also be used. A measure may also be determined that indicates the extent to which a computation instance is correctly functioning; here, gradual transitions between "is functioning correctly" and "is not functioning correctly") are possible (for example corresponding to particular aspects or to a probability gradation).

According to an example embodiment of the present invention, preferably, the method includes a stopping of the at least one monitored computation instance when the correctness measure indicates that the at least one monitored computation instance is not functioning correctly, or is functioning correctly only to an extent that is less than a prespecified minimum extent. Computation instances that frequently supply incorrect or inaccurate results can be excluded in this way, and the accuracy of the response can thus be indirectly improved.

According to an example embodiment of the present invention, preferably, the results are compared to one another in order to determine the response; here, as the response one of the results is used that most frequently agrees with other results within specified tolerances; further preferably, the result agrees with at least a specified minimum number of the results within specified tolerances. This procedure can be regarded as a type of calibration method. In particular, for results different from one another (taking into account the tolerances), in each case a result number can be determined, and, of the differing results, the one having the highest result number can be used as response; here, preferably the result number has to be greater than the specified minimum number of results. In the determination of the result number, weights of the results can also be taken into account; that is, each result goes into the count by which the result number is obtained in a manner corresponding to the weight of the result. Thus, the result number is not necessarily a whole number, but rather can be any real number (greater than zero), depending on the values that the weights have. In the comparison, tolerances are taken into account, because in particular in the case of continuous numerical results small differences in the results from different algorithms may occur without the results being substantially different; i.e., in the sense of the function they are to be regarded as the same. Such tolerances can be indicated as maximum relative or absolute deviation, and can be determined by the person skilled in the art who is implementing the function using algorithms.

In addition to a comparison of the results, of course other possibilities are also possible for determining the response from the results. For example, in the case of numerical values an average value can be determined as the response; here in addition the scatter (e.g. standard deviation) of the results around the average value can be determined and possibly indicated in the response. A requirement included in the quality requirement could correspondingly be a maximum scatter that is to be observed.

A providing computing unit according to the present invention is set up, in particular in terms of programming, to carry out a method according to the present invention. The providing computing unit can be for example a control device of a (motor) vehicle, or can be included in such a device (the subscriber may then be a different control device, or a different computer program executed in the same control device). Likewise, the providing computing unit can also be a computing unit of the group of computing units in which a providing instance, i.e. a providing computer program, is executed that is set up to carry out a method according to the present invention. This can also be the case for a plurality of computing units of the group of computing units. In addition, at least one separate providing computing unit can be provided in the group of computing units, or can stand in a communicative data connection with the group. In every case, a plurality of providing computing units can be provided. Combinations of the examples named above are also possible.

The implementation of a method according to the present invention in the form of a computer program, or providing computer program, or computer program product having program code for carrying out all method steps may be advantageous because it results in particularly low costs, in particular if an executing control device is also used for further tasks and is therefore already present anyway. Finally, a machine-readable storage medium is provided having a computer program as described above stored thereon. Suitable storage media or data carriers for providing the computer program are in particular magnetic, optical, and electrical memories, such as hard drives, flash memories, EEPROMs, DVDs, and others. The download of a program over computer networks (Internet, intranet, etc.) is also possible. Such a download may be wire-bound or cable-bound, or may be wireless (e.g., via a WLAN network, a 3G, 4G, 5G, or 6G connection, etc.).

Further advantages and embodiments of the present invention result from the description and the figures.

The present invention is shown schematically in the figures on the basis of exemplary embodiments, and is described below with reference to the figures.

DETAILED DESCRIPTION OF EXAMPLE EMBODIMENTS

Figure 1:
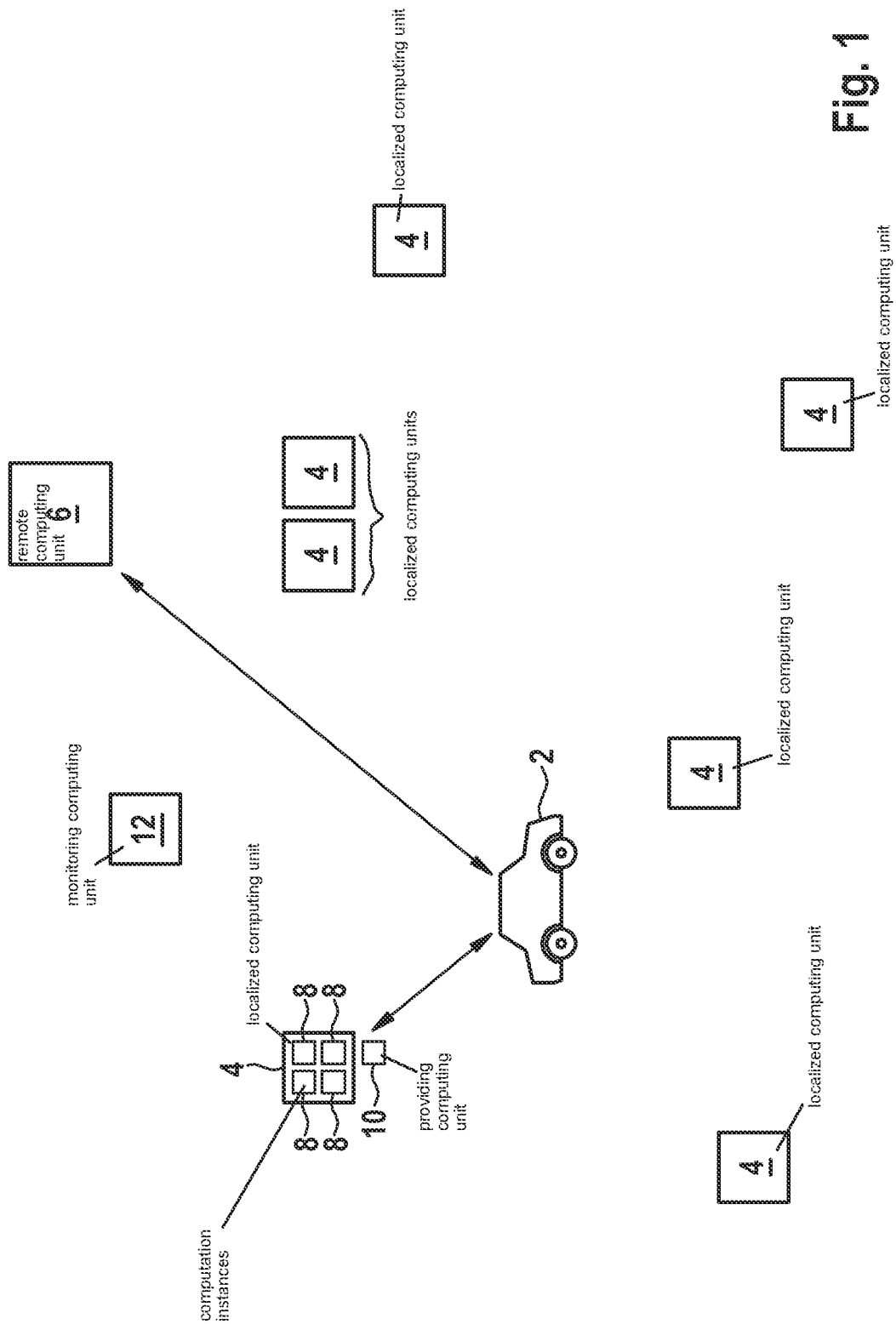
FIG. 1 shows an example of a group of computing units and a subscriber, according to an example embodiment of the present invention.

FIG. 1 shows, as an example, a group of computing units 4, 6, in which computation instances 8 are executed, and a subscriber 2. The group of computing units provides functions or services for a multiplicity of subscribers, e.g. the depicted subscriber 2. Shown are a plurality of (geographically) localized computing units 4, e.g., so-called edge servers, and a remote computing unit 6, e.g., a so-called cloud server.

The localized computing units 4 are advantageously configured in spatially distributed fashion, so that subscribers requesting a provided function will with high probability be situated in the vicinity of at least one localized computing unit 4, so that a low latency, or low signal runtimes, can be achieved in the data communication, making it possible to relocate time-critical functions of a subscriber-specific computing unit into the group of computing units. Localized computing units 4 are thus computing units separate (remote) from the subscriber, to each of which a location can be assigned; that is, they are located out of view of the subscriber. Preferably, localized computing units 4 are situated at the edge of a communication network that is directly connected to the subscribers. Typically, the communication network is a mobile radiotelephone network, e.g. a 4G or 5G network. In the case of a mobile radiotelephone network, localized computing units 4 can be situated in the vicinity of base stations and/or in the vicinity of gateways that connect the base stations to the core network of the mobile radiotelephone network, so that a localized computing unit can be assigned to one or more radio cells. A plurality of different computing units can be situated at one location.

Differing from this, remote computing unit 6 is a computing unit (or a plurality of computing units) situated at an essentially undetermined location. The data communication to the remote computing unit takes place for example first over the mobile radiotelephone network to which subscribers have a direct connection, and subsequently over a further data communication network, such as the Internet, that enables data communication over large distances. In general, the signal runtimes in the data communication between a subscriber 2 and the remote computing unit 6 are significantly longer than signal runtimes between subscriber 2 and localized computing units 4 (the latter can be for example a few milliseconds, while the former may be greater by a factor of 10).

Here, subscriber 2 is for example a vehicle that has a control device, i.e. a subscriber-specific computing unit, and a mobile radiotelephone terminal device connected thereto, so that the control device can communicate with computing units of the group of computing units via a mobile radiotelephone connection. In particular, in this way subscriber 2 can request functions or services provided by the group of computing units.

In general, computation instances 8 (shown symbolically as an example in one of the computing units 4) are software, or computer programs, executed in the computing units, and/or hardware (e.g. ASIC or FPGA) that in each case implement at least one algorithm in order to provide the function. That is, the function can be called in each computation instance 8 (with the communication of the respective call parameters, to the extent that the function requires these) in order in each case to determine at least one result (e.g. by each algorithm) that is returned to the caller, or calling element.

The term "function" is to be understood in a general sense, i.e. as a mapping of input values, or call parameters, onto output values, or results, for example using calculations. Input values can be for example sensor data, state data of the subscriber or of elements of the subscriber, data derived from sensor data and/or state data (e.g. sensor and/or state data processed by a subscriber-specific computing unit), and/or the like. It may be that a function is implemented in different ways, i.e. by various algorithms that in general supply different results; here, if the algorithms are implemented correctly and are executed without error, the results will differ from one another only slightly or not at all, i.e. will be equal within specified tolerances. As a function, for example sensor data from camera sensors and/or lidar sensors and/or radar sensors could be evaluated using image processing algorithms in order to recognize objects in the environment of the subscriber. The recognized objects, or their positions, can then be used as a result by the subscriber, which is for example a vehicle, to implement automatic or partly automatic driving functions. A further example is the evaluation of sensor data and/or state data of an element of the subscriber, e.g. of an engine of an automobile, in order to check whether this element is functioning correctly. Functions that enable a cooperation of a plurality of subscribers are also possible; for example, for automobiles a function could evaluate camera images from one or more of the subscribers in order to recognize unoccupied parking spaces that are then communicated to other subscribers that call the function with a parking space search query, the current position for example being communicated. Cooperative driving functions for automobiles that support automatic or partly automatic controlling are also possible.

In addition, a providing computing unit 10 is shown, here as an example in the vicinity of one of the localized computing units 4. Providing computing unit 10 is set up (for example by executing a providing computer program) to carry out a method according to the present invention; that is, from the point of view of subscriber 2 the function request is sent to providing computing unit 10, which then calls the function in computation instances 8 and returns or sends the response to the subscriber. Providing computing unit 10 can also start or end computation instances. If, as shown, providing computing unit 10 is situated in the vicinity of one of the (localized or remote) computing units, i.e. is assigned to one or more of the computing units, it may (but does not have to) be provided that it uses only computation instances in the assigned computing unit or units. A plurality of providing computing units can be provided (not shown). In addition to separate providing computing units 10, it is also possible (not shown) for at least one providing computer program (providing instance) to be executed in at least one computing unit of the group of computing units that implements a method according to the present invention. It is also possible (not shown) for a providing computing unit 10 to be provided in the subscriber, e.g. to be included in a control device (subscriber-specific computing unit), or for a providing computer program to be executed in a control device of the subscriber.

In addition, an optional monitoring computing unit 12 is shown, here for example as a separate computing unit. Alternatively, a monitoring computer program, or monitoring instance, could be executed in one of the (localized or remote) computing units 4, 6. Monitoring computing unit 12, or the monitoring computer program, is set up to start computational instances, to monitor executed computation instances in order to determine the degree of correctness, and/or to stop computation instances, e.g. if the correctness measure of a computation instance falls below a minimum correctness measure.

Figure 2:
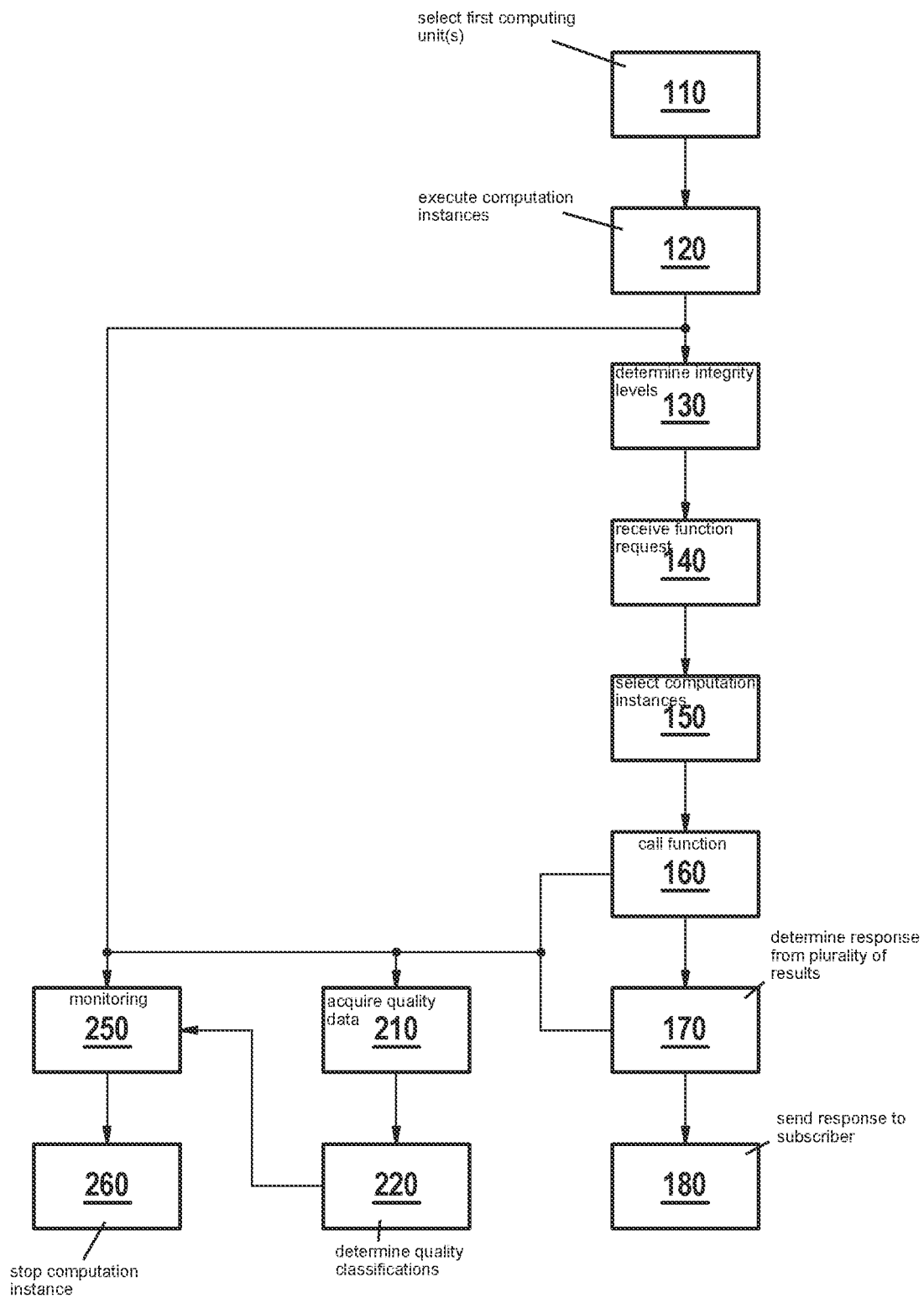
FIG. 2 shows a flow diagram according to a preferred specific embodiment of the present invention.

FIG. 2 shows a flow diagram according to a preferred specific embodiment of the present invention. In a preferred step 110, first one or more computing units of the group of computing units are selected, e.g. randomly or with respect to quality requirements to be expected (such as different hardware or the like, or a minimum number of different computing units). In a likewise preferred step 120, the execution of computation instances in the selected computing units begins. Here, each computation instance can be assigned to a particular computing unit, and/or possibly at least some of the computation instances can be executed in different computing units. Steps 110 and 120 can be repeatedly carried out during the further running of the method, in particular in order to meet particular requirements included in a quality requirement, or when computation instances are stopped. In general, a "pool" of constantly running computation instances can be provided, and steps 110 and 120 are therefore optional.

In step 130, integrity levels are determined for each of the (executed) computation instances; i.e., it is determined how trustworthy a computation instance is, or how trustworthy results are that are determined by the computation instance. The integrity level, e.g. indicated by an integrity value, can be determined from empirical values, i.e. data acquired during the execution of the computation instance (e.g. indicating how well results determined by the computation instance agree with the corresponding response). In the determination of the integrity level, known properties of the computation instances and/or of the computing units in which the computation instances are carried out can be taken into account. The integrity levels or integrity values can be stored in tables or lists for the computation instances that are preferably updated when new empirical values are obtained.

In step 140, a function request (i.e. a request for the function) from a subscriber is received. The function request includes a quality requirement that includes an integrity requirement. In step 150, from the computation instances that are executed, computation instances are selected based on, or corresponding to, the quality requirement, it being ensured that computation instances are selected whose integrity level at least matches the integrity requirement. The statement that computation instances are selected "based on" or "corresponding to" the quality requirement is intended to mean that requirements included in the quality requirement are (expected to be) met. For this purpose, for example quality classifications of the computation instances and/or of the computing units can be used. The function request may also include call parameters for the function.

In step 160, the function is called corresponding to the function request in the computation instances selected in step 150, in order to determine a plurality of results. During the call, the call parameters are given to the respective computation instances or to the algorithms that implement the function.

In step 170, from the plurality of results, taking into account the quality requirement, a response is determined, which is sent to the subscriber in step 180. Additionally or as part of the response, indications can be sent to the subscriber that indicate the extent to which the quality requirement is met.

Preferably, in step 210 quality data are acquired, and in particular data determined in steps 160 and 170 are used for this. Quality data may be for example data indicating how long computation instances require to determine and return results in response to a call of the function (call time durations of the computation instances), or the extent to which the results of a computation instance agree with the corresponding response. Based on the acquired quality data, in the further preferred step 220 quality classifications of the computation instances and/or of the computing units are determined and/or modified. Such quality classifications may be known, or specified, at the beginning of the method, and adapted using steps 210, 220.

In a preferred step 250, there takes place a monitoring of at least one of the computation instances in order to determine, for the at least one monitored computation instance, a correctness measure that indicates whether, or to what extent, this instance is functioning correctly. Step 250 is carried out continuously, e.g. at particular times or at particular time intervals, while the computation instances are executed. During the monitoring, in particular in steps 160 and 170 particular data can be used (e.g. call time durations of the computation instances, or the extent to which the results of a computation instance agree with the corresponding response). In addition or alternatively, the quality classifications determined or modified in step 220 may be used. The execution of test calls is also possible.

In a further preferred step 260, there takes place a stopping of a computation instance if it is determined that the correctness measure determined for this instance in step 250 falls below a specified minimum correctness measure. In this way, computing power is made available in the computing units for other computation instances, and the trustworthiness of future responses is improved.

What is claimed is:

1. A method for providing a function by a group of computing units in which computation instances are executed, each computation instance implementing the function using at least one algorithm and being set up to determine at least one result in response to a call of the function, the method comprising the following steps:

determining an integrity level for each of the computation instances;

receiving a function request from a mobile subscriber travelling through a plurality of areas that are serviceable by different subsets of the computing units, the function request including a quality requirement that includes an integrity requirement;

based on a current location of the mobile subscriber and based on the included integrity requirement, selecting a respective subset of the computation instances distributed over the computing units, the respective subset including a plurality of the computation instances corresponding to the quality requirement, so that the integrity level of the selected computation instances corresponds to the integrity requirement;

calling the function so that the function is redundantly executed in each of the selected computation instances corresponding to the function request to determine a plurality of results;

selecting a subset of the results based on similarities between the results, the selection omitting those of the results that are determined to be outliers;

determining a response by calculating a new result based on the selected subset of the results; and sending the response to the subscriber.

2. The method as recited in claim 1, wherein the quality requirement includes one or more requirements selected from: a minimum number of different selected computation instances, a minimum number of different computing units in which the selected computation instances are executed, a minimum number of results, a minimum number of results that agree with the determined response within tolerances, a maximum scatter of the results.

3. The method as recited in claim 1, wherein the selection of the computation instances is made corresponding to the quality requirement based on quality classifications of the computing units and/or of the computation instances, the classifications characterizing which quality requirements are satisfied by the computing units, and/or the computation instances, and/or combinations of particular computing units and computation instances.

4. The method as recited in claim 3, further comprising a determination and/or modification of the quality classifications based on actual quality data that are obtained during the calling of the function and/or during the determination of the response.

5. The method as recited in claim 1, wherein the quality requirement includes a response time requirement.

6. The method as recited in claim 5, wherein the determining of the response takes place based on the results obtained within the response time requirement, the determination of the response taking place based on the results obtained within the response time requirement taking into account a time offset.

7. The method as recited in claim 1, wherein the response includes indications of an extent to which the quality requirement is met, the indications including an integrity level actually achieved by the response.

8. The method as recited in claim 1, further comprising selecting at least one computing unit of the group of computing units, and starting the execution of at least one computation instance in the selected at least one computing unit.

9. The method as recited in claim 1, further comprising monitoring of at least one of the computation instances to determine, for the at least one monitored computation instance, a correctness measure that indicates whether or to what extent the computation instance is functioning correctly.

10. The method as recited in claim 9, further comprising stopping the at least one monitored computation instance when the correctness measure indicates that the at least one monitored computation instance is not functioning correctly or is functioning correctly only to an extent that is less than a prespecified minimum extent.

11. The method as recited in claim 1, further comprising selecting one of the subsets of computing units, and, in accordance with the selection, the calling of the function is performed such that the computation instances are executed in the selected one of the subsets of computing units.

12. The method as recited in claim 1, wherein the selection corresponding to the quality requirement is performed based on quality classifications of the computation instances, the method further comprising:
modifying the quality classifications over time based on the calling of the function in the selected computation instances and the determining of the response.

13. The method as recited in claim 1, further comprising:
monitoring at least one of the computation instances executed in the computing units of the group of computing units to determine, for the at least one monitored computation instance, a correctness measure that indicates whether or to what extent the instance is functioning correctly; and
stopping the at least one monitored computation instance when the respective correctness measure for the respective computation instance indicates that the at least one monitored computation instance is not functioning correctly, or is functioning correctly only to an extent that is less than a prespecified minimum extent.

14. The method as recited in claim 13, wherein:
the selection corresponding to the quality requirement is performed based on quality classifications of the computation instances;
the method further comprises modifying the quality classifications over time based on the calling of the function in the selected computation instances and the determining of the response; and
the correctness measure is based on the modified quality classifications.

15. The method as recited in claim 1, further comprising:
based on a plurality of cases of a determination that respective results from a particular computation instance are outliers, changing the integrity level of the respective computation instance.

16. A providing computing unit configured to provide a function by a group of computing units in which computation instances are executed, each computation instance implementing the function using at least one algorithm and being set up to determine at least one result in response to a call of the function, the providing unit configured to:
determine an integrity level for each of the computation instances;
receive a function request from a mobile subscriber travelling through a plurality of areas that are serviceable by different subsets of the computing units, the function request including a quality requirement that includes an integrity requirement;
based on a current location of the mobile subscriber and based on the included integrity requirement, select a respective subset of the computation instances distributed over the computing units, the respective subset including a plurality of the computation instances corresponding to the quality requirement, so that the integrity level of the selected computation instances corresponds to the integrity requirement;
call the function so that the function is redundantly executed in each of the selected computation instances corresponding to the function request to determine a plurality of results;
select a subset of the results based on similarities between the results, the selection omitting those of the results that are determined to be outliers;
determine a response by calculating a new result based on the selected subset of the results; and
send the response to the subscriber.

17. A non-transitory machine-readable medium on which is stored a providing computer program for providing a function by a group of computing units in which computation instances are executed, each computation instance implementing the function using at least one algorithm and being set up to determine at least one result in response to a call of the function, the providing computer program, when executed by a processor, causing the processor to perform the following steps:
determining an integrity level for each of the computation instances;
receiving a function request from a mobile subscriber travelling through a plurality of areas that are serviceable by different subsets of the computing units, the function request including a quality requirement that includes an integrity requirement;
based on a current location of the mobile subscriber and based on the included integrity requirement, selecting a respective subset of the computation instances distributed over the computing units, the respective subset including a plurality of the computation instances corresponding to the quality requirement, so that the integrity level of the selected computation instances corresponds to the integrity requirement;
calling the function so that the function is redundantly executed in each of the selected computation instances corresponding to the function request to determine a plurality of results;
selecting a subset of the results based on similarities between the results, the selection omitting those of the results that are determined to be outliers;
determining a response by calculating a new result based on the selected subset of the results; and
sending the response to the subscriber.

* * * * *